United States Patent
Nakazawa et al.

(10) Patent No.: US 10,670,892 B2
(45) Date of Patent: Jun. 2, 2020

(54) FOLDABLE ELECTRO-OPTIC DISPLAY APPARATUS

(71) Applicant: E Ink Corporation, Billerica, MA (US)

(72) Inventors: Kenji Nakazawa, Tokyo (JP); Keisuke Hashimoto, Tokyo (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/492,247

(22) Filed: Apr. 20, 2017

(65) Prior Publication Data

US 2017/0307929 A1    Oct. 26, 2017

Related U.S. Application Data

(60) Provisional application No. 62/326,137, filed on Apr. 22, 2016.

(51) Int. Cl.
| | |
|---|---|
| *G02F 1/1333* | (2006.01) |
| *G02F 1/167* | (2019.01) |
| *G02F 1/1681* | (2019.01) |

(52) U.S. Cl.
CPC ........ *G02F 1/133305* (2013.01); *G02F 1/167* (2013.01); *G02F 1/133308* (2013.01); *G02F 1/1681* (2019.01); *G02F 2201/50* (2013.01)

(58) Field of Classification Search
CPC .. G02F 1/133305; G02F 1/1333; G02F 1/133; G02F 1/167; G02F 2001/1672; G02F 2201/50
USPC .......................................................... 359/296
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 6,054,071 A | 4/2000 | Mikkelsen, Jr. |
| 6,055,091 A | 4/2000 | Sheridon |
| 6,067,185 A | 5/2000 | Albert |
| 6,097,531 A | 8/2000 | Sheridon |
| 6,128,124 A | 10/2000 | Silverman |
| 6,137,467 A | 10/2000 | Sheridon |
| 6,147,791 A | 11/2000 | Sheridon |
| 6,241,921 B1 | 6/2001 | Jacobson |
| 6,301,038 B1 | 10/2001 | Fitzmaurice |
| 6,392,785 B1 | 5/2002 | Albert |
| 6,577,496 B1 | 6/2003 | Gioscia et al. |
| 6,672,921 B1 | 1/2004 | Liang |
| 6,788,449 B2 | 9/2004 | Liang |
| 6,825,068 B2 | 11/2004 | Denis |
| 6,866,760 B2 | 3/2005 | Paolini, Jr. |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — William R Alexander
(74) *Attorney, Agent, or Firm* — William John Keyes

(57) ABSTRACT

An image display apparatus having a flexible electronic display comprising a bendable portion that is flexible and configured to display an image, a support member comprising a substantially planar portion that resists bending and a bending-protection portion that bends and protects the bendable portion of the flexible display, and a retainer for retaining the flexible electronic display proximal to a surface of the support member.

17 Claims, 12 Drawing Sheets

(56) References Cited

U.S. PATENT DOCUMENTS

| | | |
|---|---|---|
| 6,870,657 B1 | 3/2005 | Fitzmaurice |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner |
| 7,072,095 B2 | 7/2006 | Liang |
| 7,075,502 B1 | 7/2006 | Drzaic |
| 7,109,968 B2 | 9/2006 | Albert et al. |
| 7,116,318 B2 | 10/2006 | Amundson et al. |
| 7,144,942 B2 | 12/2006 | Zang |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,391,555 B2 | 6/2008 | Albert et al. |
| 7,411,719 B2 | 8/2008 | Paolini, Jr. et al. |
| 7,420,549 B2 | 9/2008 | Jacobson |
| 7,453,445 B2 | 11/2008 | Amundson |
| 7,535,624 B2 | 5/2009 | Amundson et al. |
| 7,561,324 B2 | 7/2009 | Duthaler et al. |
| 7,679,814 B2 | 3/2010 | Paolini, Jr. et al. |
| 7,715,088 B2 | 5/2010 | Liang |
| 7,839,564 B2 | 11/2010 | Whitesides et al. |
| 8,009,348 B2 | 8/2011 | Zehner |
| 8,077,381 B2 | 12/2011 | LeCain et al. |
| 9,173,287 B1* | 10/2015 | Kim ............... H05K 1/028 |
| 9,279,906 B2 | 3/2016 | Kang |
| 9,348,362 B2 | 5/2016 | Ko et al. |
| 9,406,734 B2 | 8/2016 | Kim et al. |
| 9,603,271 B2* | 3/2017 | Lee ................ H05K 5/0017 |
| 9,618,974 B2* | 4/2017 | Choi ................ G06F 1/1641 |
| 2006/0132894 A1* | 6/2006 | Schmitz ........... G02B 26/026 |
| | | 359/296 |
| 2006/0198422 A1* | 9/2006 | Chopra ............. G02F 1/167 |
| | | 374/158 |
| 2007/0268566 A1* | 11/2007 | Yang .............. G02F 1/167 |
| | | 359/296 |
| 2011/0032180 A1* | 2/2011 | Kawase ........... G02F 1/167 |
| | | 345/107 |
| 2011/0304903 A1* | 12/2011 | Jun ................ G02F 1/167 |
| | | 359/296 |
| 2011/0317250 A1* | 12/2011 | Kimura ............ G02F 1/167 |
| | | 359/296 |
| 2014/0003006 A1* | 1/2014 | Ahn ............... G06F 1/1652 |
| | | 361/749 |
| 2015/0005720 A1 | 1/2015 | Zang |
| 2015/0185782 A1 | 7/2015 | Kim et al. |
| 2015/0277160 A1 | 10/2015 | Laxton |
| 2016/0012710 A1 | 1/2016 | Lu |
| 2016/0048169 A1 | 2/2016 | Yang et al. |
| 2016/0064466 A1 | 3/2016 | Son et al. |
| 2018/0095502 A1 | 4/2018 | Yamazaki et al. |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U. et al., "Nanomaterials-Based Electrochromics for Paper-Quality Displays", Adv. Mater, 14(11), 845 (2002) Jun. 5, 2002.

Hayes, R.A. et al., "Video-Speed Electronic Paper Based on Electrowetting", Nature, vol. 425, Sep. 25, pp. 383-385 (2003) Sep. 25, 2003.

Kitamura, T. et al., "Electrical toner movement for electronic paper-like display", Asia Display/IDW '01, p. 1517, Paper HCS1-1 (2001) Jan. 1, 2001.

Yamaguchi, Y. et al., "Toner display using insulative particles charged triboelectrically", Asia Display/IDW '01, p. 1729, Paper AMD4-4 (2001) Jan. 1, 2001.

Korean Intellectual Property Office; PCT/US2017/028524; International Search Report and Written Opinion; dated Jul. 17, 2017. Jul. 17, 2017.

\* cited by examiner

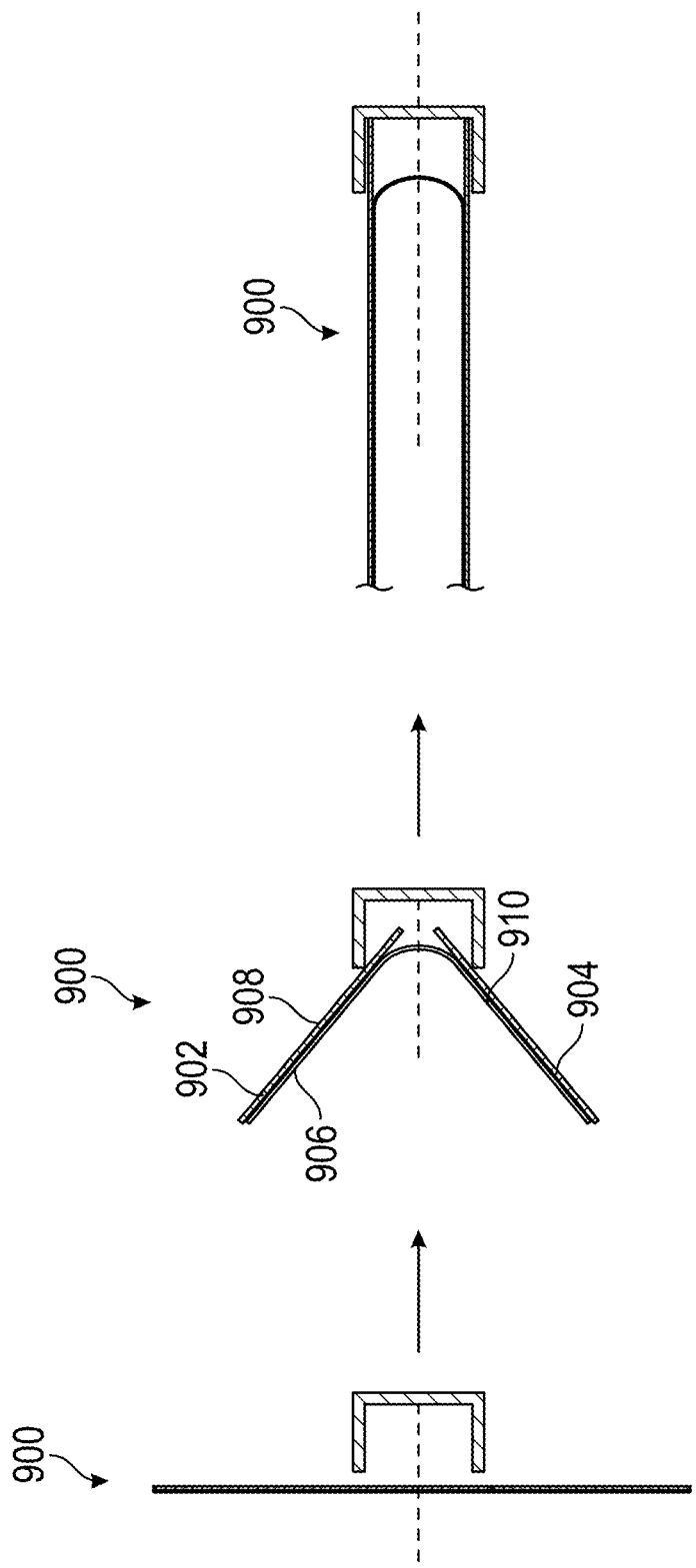

FOLDABLE ELECTRO-OPTIC DISPLAY APPARATUS

REFERENCE TO RELATED APPLICATIONS

This application claims benefit of Application Ser. No. 62/326,137, filed Apr. 22, 2016. The entire contents of the application, and of all other U.S. patents and published and applications mentioned below, are herein incorporated by reference.

SUBJECT OF THE INVENTION

This invention relates to reflective electro-optic display apparatuses and materials for use in such displays. More specifically, this invention relates to flexible electro-optic displays that may be folded in a book like fashion.

BACKGROUND OF INVENTION

This invention relates to backplanes for electro-optic displays, and to processes for the formation of such backplanes. The backplanes of the present invention are especially, but not exclusively, intended for use with particle-based electrophoretic displays in which one or more types of electrically charged particles are suspended in a liquid and are moved through the liquid under the influence of an electric field to change the appearance of the display.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published US Patent Application No. 2002/0180687 (see also the corresponding International Application Publication No. WO 02/079869) that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (Mar. 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348;

(j) Non-electrophoretic displays, as described in U.S. Pat. No. 6,241,921 and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymerdispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as subspecies of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indiumtin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

As discussed in the aforementioned U.S. Pat. No. 6,982, 178, (see column 3, line 63 to column 5, line 46) many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to encapsulated displays. Because the electrophoretic material is solid, it must be present between the backplane and the front electrode before these two integers are secured to each other. Furthermore, in contrast to a liquid crystal material, which is simply placed between the front electrode and the backplane without being attached to either, an encapsulated electrophoretic medium normally needs to be secured to both; in most cases the electrophoretic medium is formed on the front electrode, since this is generally easier than forming the medium on the circuitry-containing backplane, and the front electrode/electrophoretic medium combination is then laminated to the backplane, typically by covering the entire surface of the electrophoretic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays, including electrophoretic displays, can be costly; for example, the cost of the color LCD found in a portable computer is typically a substantial fraction of the entire cost of the computer. As the use of such displays spreads to devices, such as cellular telephones and personal digital assistants (PDA's), much less costly than portable computers, there is great pressure to reduce the costs of such displays. The ability to form layers of electrophoretic media by printing techniques on flexible substrates, as discussed above, opens up the possibility of reducing the cost of electrophoretic components of displays by using mass production techniques such as roll-to-roll coating using commercial equipment used for the production of coated papers, polymeric films and similar media.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at nonvisible wavelengths, the term "light-transmissive" should of course be interpreted to refer to transmission of the relevant nonvisible wavelengths. The substrate will typically be a polymeric film, and will normally have a thickness in the range of about 1 to about 25 mil (25 to 634 µm), preferably about 2 to about 10 mil (51 to 254 µm). The electrically conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2007/0109219 also describes various methods designed for high volume manufacture of electro-optic displays using inverted front plane laminates; preferred forms of these methods are "multi-up" methods designed to allow lamination of components for a plurality of electro-optic displays at one time.

Electrophoretic media and displays tend to be mechanically robust, as compared with, for example, liquid crystal displays, which require transparent, typically glass, substrates on both sides of the liquid crystal medium. Several of the aforementioned E Ink patents and applications describe processes for producing electrophoretic displays in which an electrophoretic medium is coated on to a flexible plastic substrate provided with an electrically conductive layer, and the resultant electrophoretic medium/substrate sub-assembly is laminated to a backplane containing a matrix of electrodes to form the final display. Furthermore, the aforementioned U.S. Pat. No. 6,825,068 describes a backplane useful in an electrophoretic display and based upon a stainless steel foil coated with a polyimide. Such technologies can produce flexible electrophoretic displays much less susceptible to breakage than glass-based liquid crystal displays.

However, although electrophoretic displays are mechanically robust, such displays can be damaged under extreme stress, such as may occur when a portable electrophoretic display is dropped or comes into contact with a heavy object, for example in a travel bag. Typically, such failure occurs by mechanical rupture of the capsule wall, in the case of capsule-based displays, or by rupture of the continuous phase in polymer-dispersed displays. Either type of failure allows the internal phase (the electrophoretic particles and the surrounding fluid) of the electrophoretic medium to migrate within the display. Typically, a lamination adhesive layer is present adjacent the electrophoretic medium, and the fluid dissolves in this adhesive layer, leaving behind the electrophoretic particles as an optically inactive, non-switching area which causes visual defects in any image thereafter written on the display. Accordingly, there is a need to improve the mechanical robustness of electrophoretic media and displays to reduce the occurrence of such visual defects.

In some instances, a flexible display may be folded for portability and/or convenience of storage. If the display was simply folded in a book like fashion, it may be folded with a radius of curvature that is smaller than a minimum radius of curvature designed to prevent display breakage. To prevent such problem, various mechanisms, such as hinges and/or other structures, have been implemented to the bending portions of the display. For example, as illustrated in FIG. 1A, Polymer Vision has disclosed a product Readius™ using one or more mechanical hinge mechanisms to facilitate the folding of the flexible display.

In another example illustrated in FIG. 1B, Japanese Patent Laid-Open Publication No. 2014-161009 disclosed a flexible mobile terminal device configured to bend at various angles. The terminal device is proposed to include a folding portion 160 for bending the device to a front surface or a rear upper position of a terminal device body 110. A flexible display 300 mounted on an upper portion of the terminal device body 110 can be bend to the front surface or a rear surface depending on a bending direction of the folding portion 160. The device further includes a sliding portion for causing one end of the flexible display 300 to slide by a difference between degrees of compression/tension generated by a difference in extension rates of the folding portion 160 and the flexible display 300 during bending of the folding portion.

Both examples described above result in thick and heavy products. The Readius™ by Polymer Vision employs mechanical hinge mechanisms that are complex in structure and bulky in shape. The device illustrated in FIG. 1B (Japanese Patent Laid-Open Publication No. 2014-161009) has a bellows shape and the sliding portion takes labor to adjust, and the device is also complex and bulky.

The present invention provides electro-optic displays that are flexible, thin and light-weighted, and may be folded in a book like fashion.

SUMMARY OF INVENTION

This invention provides an image display apparatus having a flexible electronic display. The flexible electronic display can include a bendable portion that is flexible and configured to display an image. The display apparatus may further include a support member having a substantially planar portion that resists bending and a bending-protection portion that bends and protects the bendable portion of the flexible display, and a retainer for retaining the flexible display proximal to a surface of the support member.

In some embodiments, the flexible electronic display may comprise an electrophoretic medium, where the electrophoretic medium is encapsulated.

In some other embodiments, the bending-protection portion of the image display apparatus may include walls defining a cavity configured to accept deflection of the flexible electronic display during bending. Furthermore, to limit the motion of the flexible electronic display with respect to the support member, the retainer may come into contact with the flexible electronic display, where the retainer can be configured to allow the flexible electronics display to move in a direction substantially perpendicular to the direction in which the bending-protection portion is configured to bend. The retainer may be further designed to include a housing having an opening for incorporating a protective cover designed for protecting the flexible display surface.

BRIEF DESCRIPTION OF DRAWINGS

As already mentioned.

FIGS. 9A to 9C illustrate yet another embodiment of the electronic book where portions of the display layer are bonded to the core plates.

DETAILED DESCRIPTION

As indicated above, the present invention provides an electro-optic display or an image display apparatus that is flexible and may be folded in a book like fashion. The display apparatus may include a flexible display and a bending-protection member for accommodating the flexible display in a closed state. In some embodiments, the flexible display may be movably enclosed between multiple layers of leather, where two core plates may provide support to the flexible display.

Figure 1A:
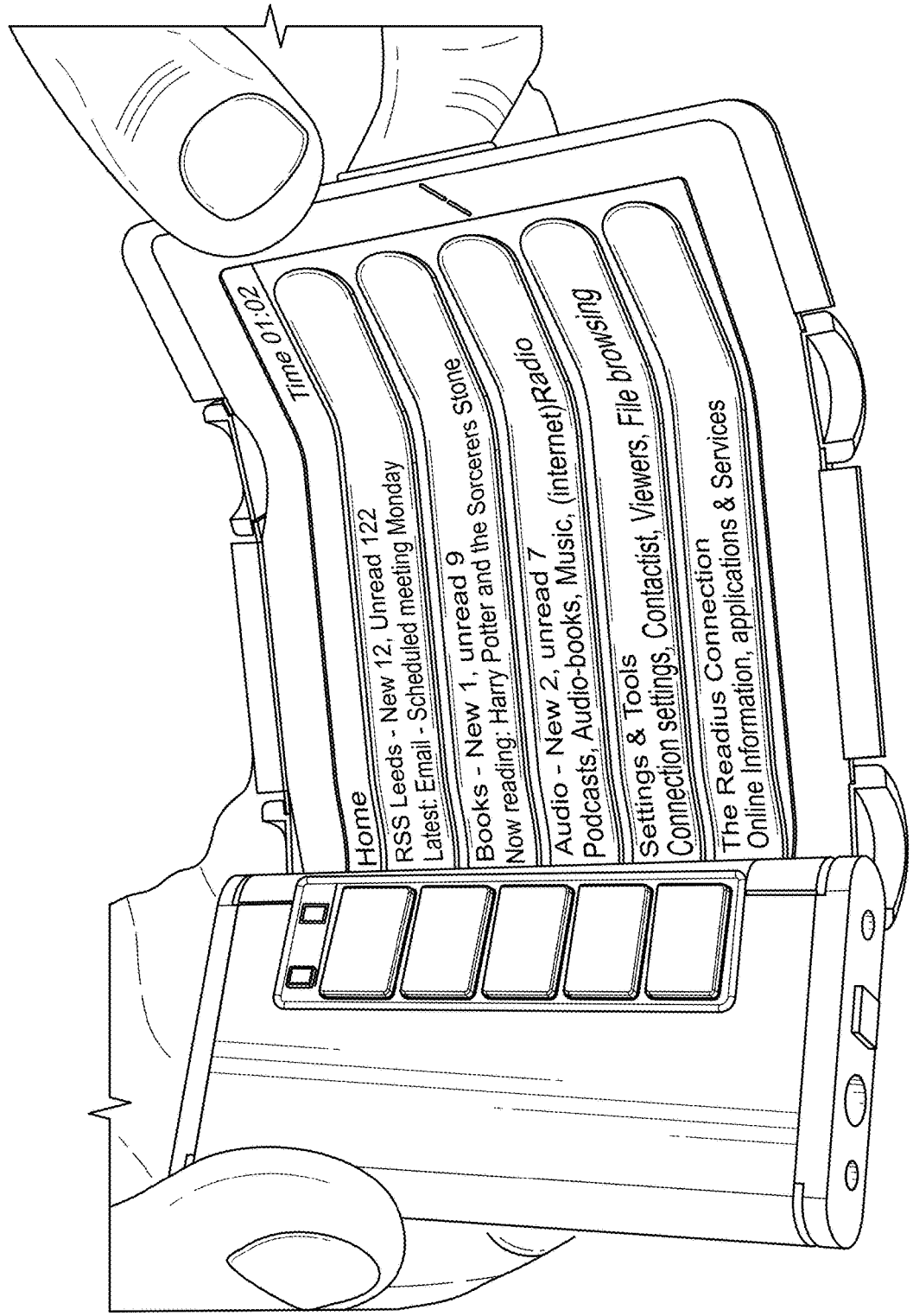
FIG. 1A and FIG. 1B illustrate two bendable displays (prior art)
Figure 1B:
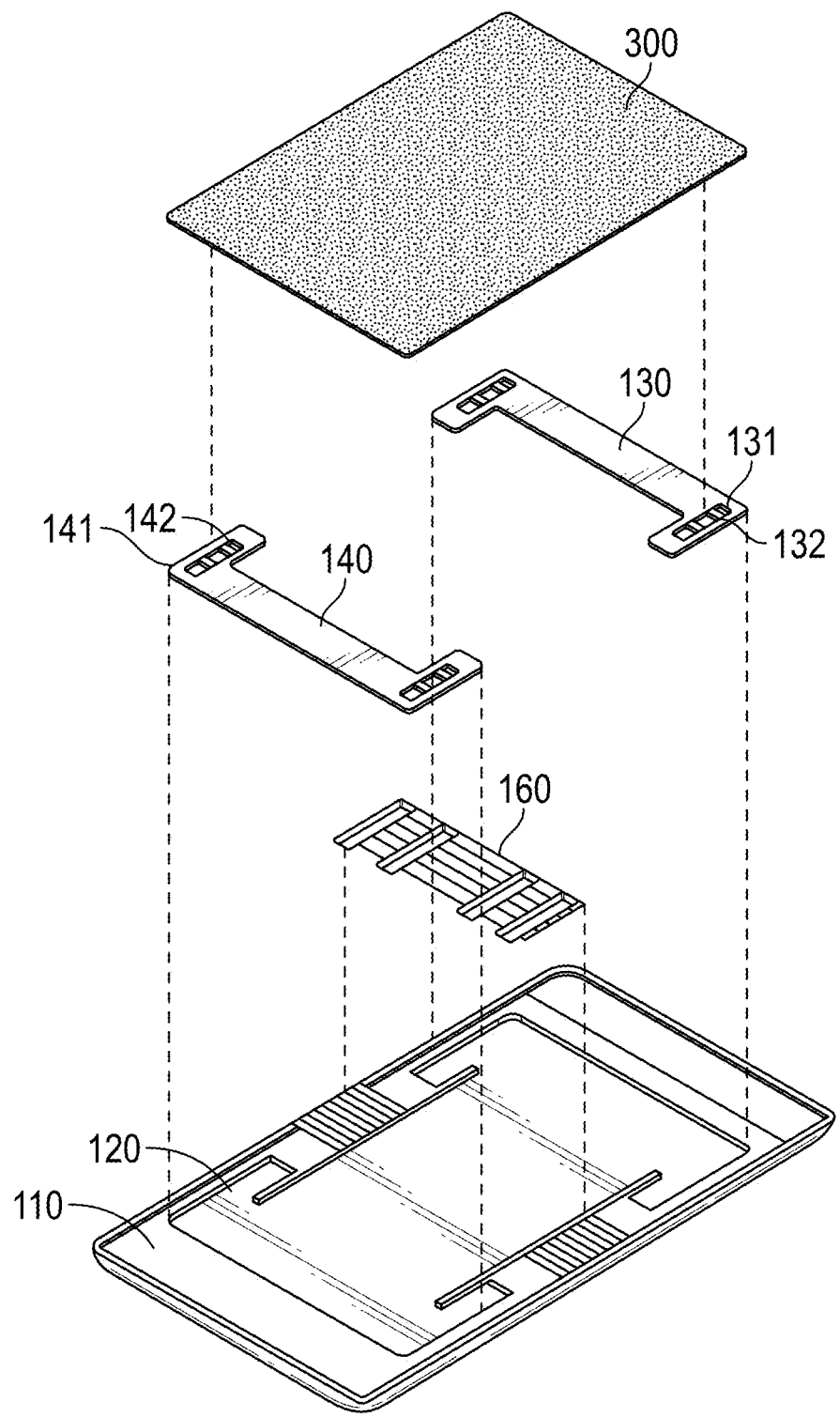
Figure 2A:
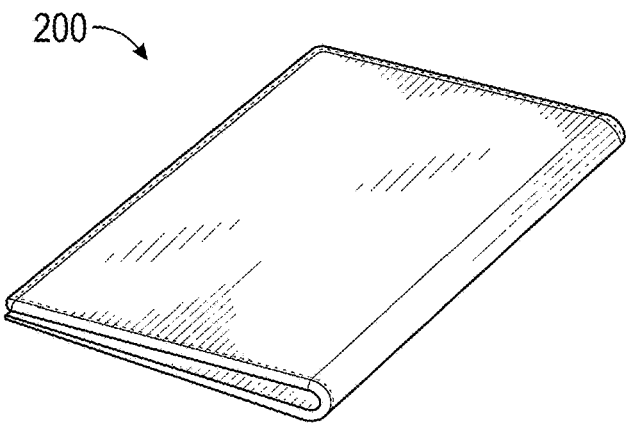
FIGS. 2A to 2C illustrate an electronic book in an open state, a half-opened state and a closed state in accordance with the subject matter presented herein.
Figure 2B:
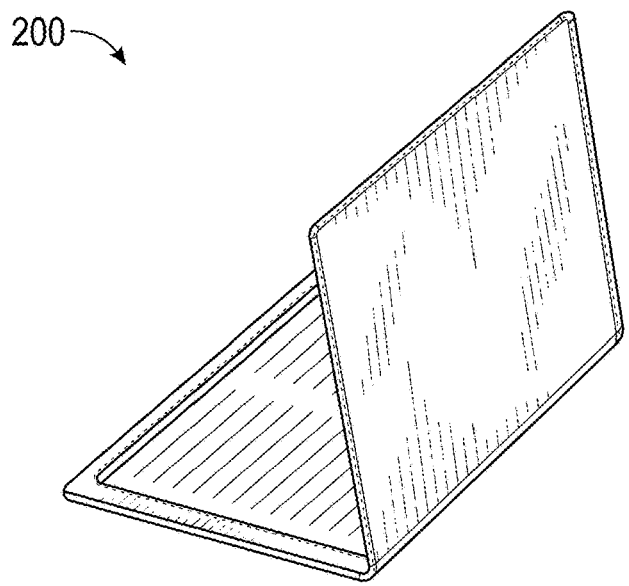
Figure 2C:
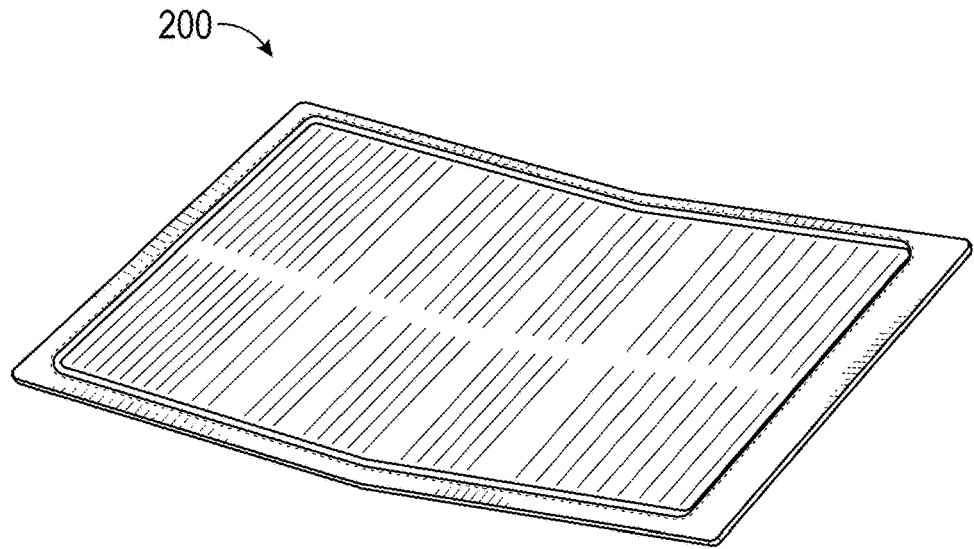

In accordance with the subject matter presented herein, FIGS. 2A to 2C illustrate an image display apparatus (e.g., an electronic book 200) having a thickness approximate to a book cover for an ordinary book. The electronic book 200 may be carried like a thin book and may be held in hand in a half-opened state like a book, as illustrated in FIG. 2B. In a preferred embodiment, the electronic book 200 may be read as if it was an ordinary book, and when it is fully opened, the electronic book 200 can have a substantially flat overall shape like it is illustrated in FIG. 2C. Furthermore, referring now to FIG. 2A, the electronic book 200 can be fully closed like an ordinary book. To achieve that purpose, the electronic book 200 can include a flexible display (e.g., a flexible electronic display) that is capable of being folded in the fully closed position without suffering breakage due to folding. The flexible display is an active display throughout, meaning, the entire flexible display is capable of displaying images, including the folded or bendable portions.

Figure 3A:
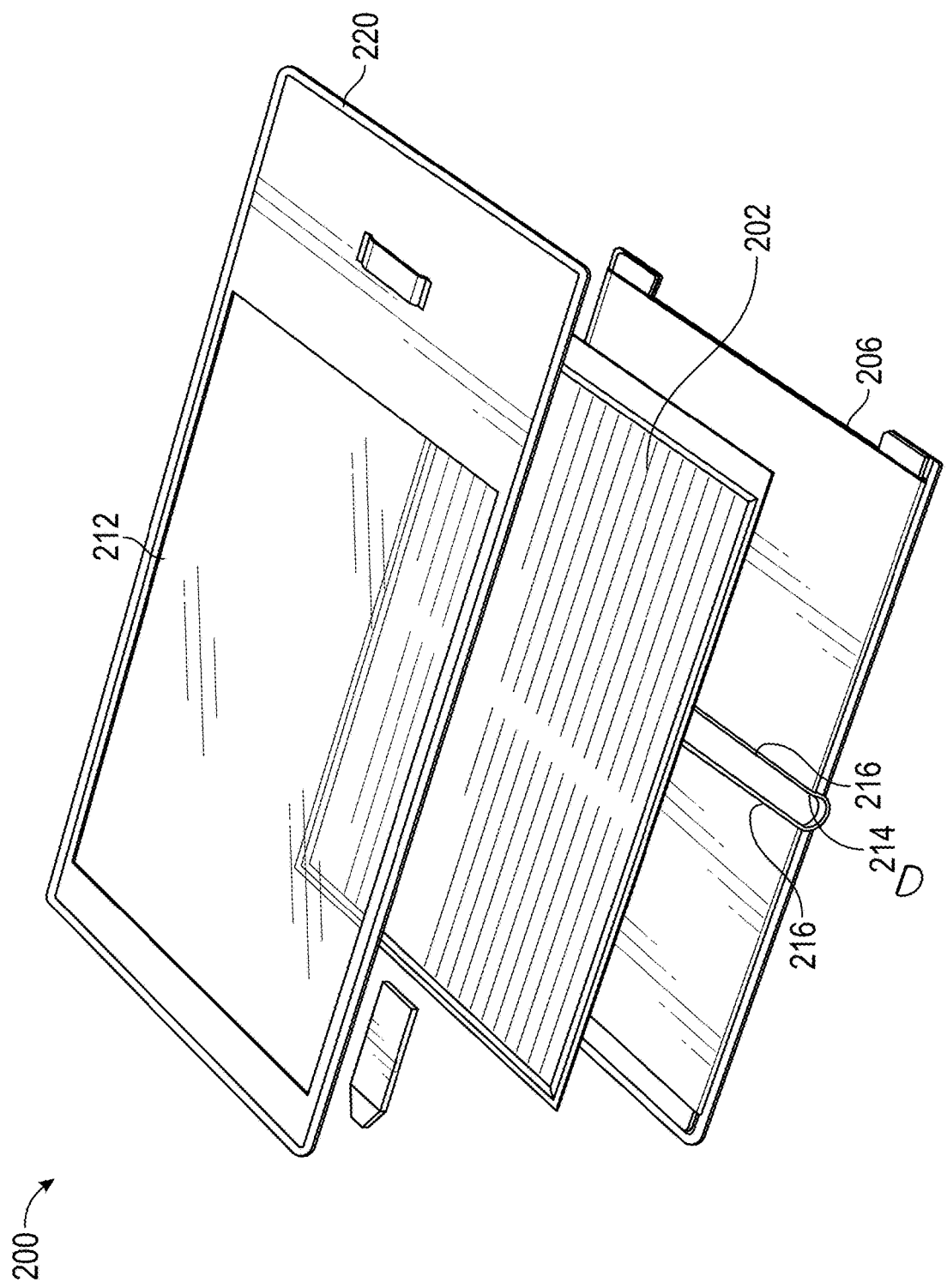
FIG. 3A illustrate an exemplary configuration of the electronic book in accordance with the subject matter presented herein.
Figure 3B:
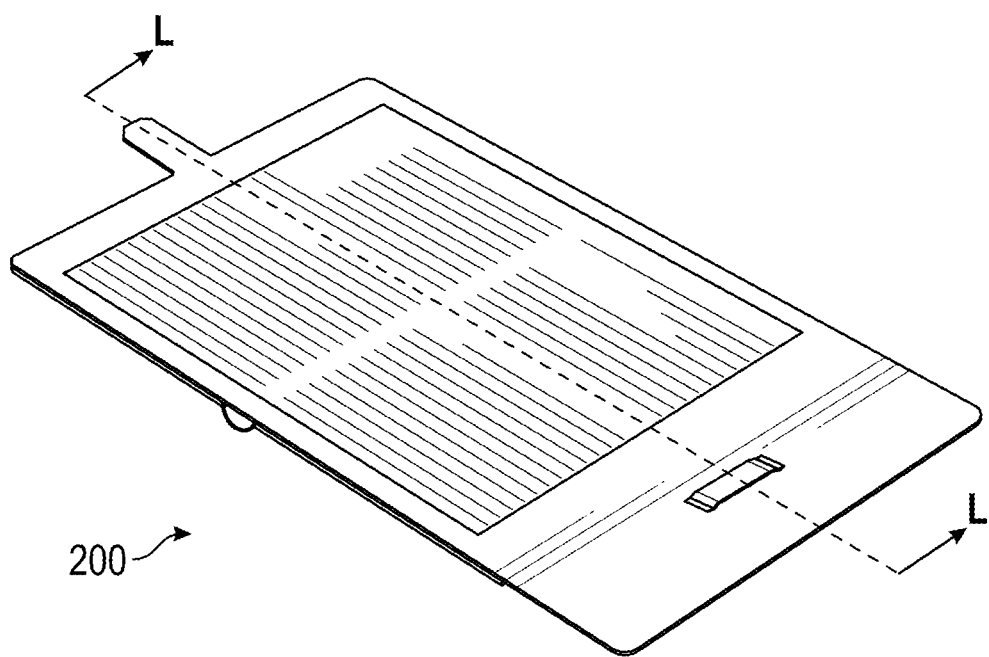
FIG. 3B illustrates an overview of the electronic book presented in FIG. 3A in accordance with the subject matter presented herein.
Figure 4:
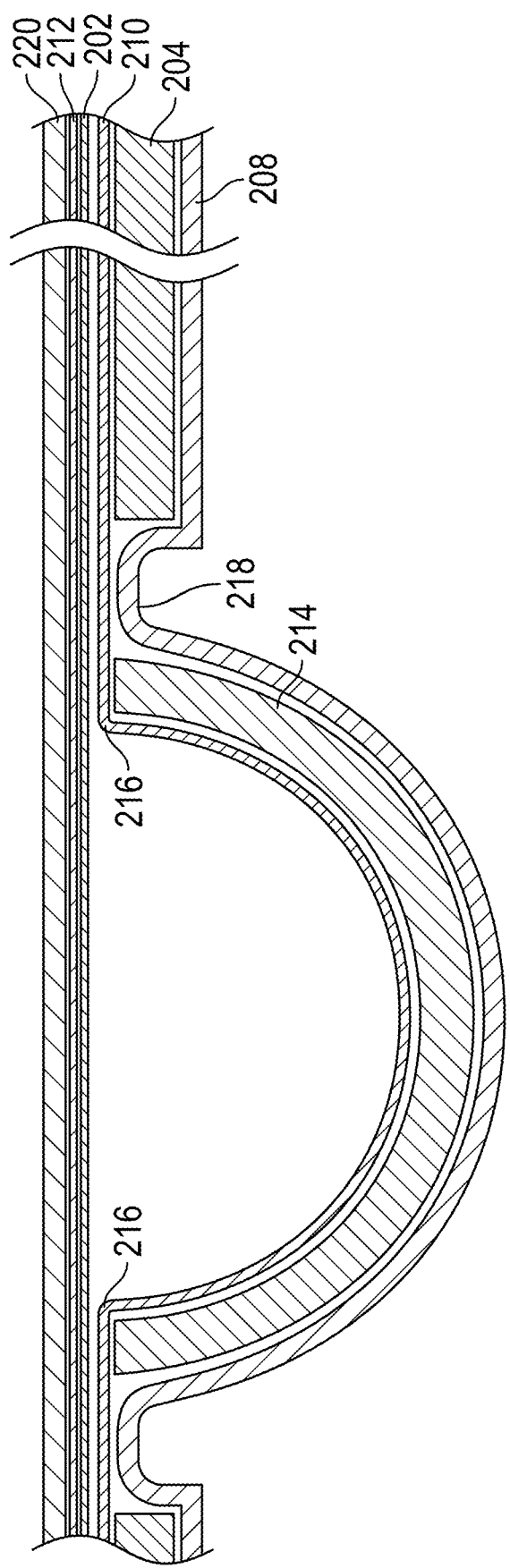
FIG. 4 is a cross-sectional view of the electronic book in the open state in accordance with the subject matter presented herein.

In some embodiments, the display apparatus' flexible display can include a bendable portion that is flexible and capable of displaying images, and the apparatus can also include a support member having a bending-protection portion that bends or folds and protects the bendable portion, and a retainer for retaining the flexible display proximal to a surface of the support member. Preferably, the bendable portion may further include one or more substantially planar portions that resists bending, and the bending-protection portion may include walls defining a cavity configured to accept deflection of the flexible electronic display during bending. For example, the substantially planar portions may include a first planar portion and a second planar portion, where the first and second planar portions may be coupled to the bending-protection portion on opposed sides of the bending-protection portion. In some embodiments, the first and second planar portions are coupled to the bending-protection portion with an outer covering coupled to the first and second planar portions and to the bending-protection portion. In use, the bending-protection portion may overlap an edge of the first planar portion and an edge of the second planar portion, and the bending protection portion may be flexible and allows the first planar portion to move in an arc with respect to the second planar portion. FIGS. 3A and 3B illustrate an exemplary configuration of the electronic book 200 in accordance with the subject matter presented herein, and FIG. 4 illustrates a cross-section through the electronic book 200 in the configuration presented in FIGS. 3A and 3B, this cross-section being taken along the line of symmetry L of the electronic book 200, as indicated in FIG. 3B. In use, the retainer can contact the flexible electronic display and limit the motion of the flexible electronic display with respect to the support member. In some other embodiments, the retainer may be designed to allow the flexible electronic display to move in a direction substantially perpendicular to the direction in which the bending-protection portion is configured to bend.

As illustrated in FIGS. 3A and 3B, and as well as in FIG. 4, an electronic book 200 may include a flexible electronic display 202 supported by one or more core plates 204 (see FIG. 4), and a sub-assembly 206 which includes an outside leather cover 208 and a back sheet 210, where the sub-assembly 206 is designed to house the one or more core plates 204. In addition, a transparent polypropylene (pp) film 212 may be placed on a top surface (i.e., the viewing surface) of the flexible electronic display 202 for providing an extra layer of protection. In this configuration, a lower surface of the flexible electronic display 202 may be supported by the two core plates 204, which are substantially planar in shape. A hollow hemi-cylindrical rigid pipe 214 may be positioned between the two core plates 204 and retained in position by the outside leather cover 208 and the back sheet 210, where this hemi-cyylindrical body may define a bending axis for the display. The rigid pipe 214, together with the overlaying leather layers (e.g., back sheet 210 and outside leather cover 208), may function as a bending protection portion designed to reduce display breakage resulting from the folding of the display 202. It should be appreciated that other geometric shaped bending protection portion can be adopted here as well. Preferably, the bending protection portion will have walls defining a cavity configured to accept deflection of the flexible electronic displaying during bending, and in some embodiments, this bending-protection portion can define a bending axis of the support member and comprises a hemi-cylindrical body. The outside leather cover 208, the back sheet 210 and the rigid pipe 214 may be fixed together by adhesives or the like, and the joining portions between the two core plates 204 and the rigid pipe 214 may be flexible such that the electronic book 200 may be opened or closed along the long edges 216 of the pipe 214. As illustrated in FIG. 4, the core plates 204 and the pipe 214 may be fixed to the outside leather cover 208 such that the core plates 204 may be folded together to face one another (not shown here). Hinge portions 218 of the outside leather cover 208 may be designed to be easily bendable for accommodating the opening and closing of the electronic book 200, and it should be appreciated that other geometric configurations suitable for this purpose can be easily adopted here.

In some embodiments, an inside leather cover 220 may be placed over the pp film 212 but leaving the display portion of the flexible electronic display 202 exposed. The inside leather cover 220 can be affixed to the outside leather cover 208 by adhesion, bonding, sewing and the like. The flexible electronic display 202 may be sandwiched between a retainer constituting the inside leather cover 220 and the outside leather cover 208 (and optionally also the pp film 212 and/or the core plates 204) as illustrated in FIG. 4. However, the flexible electronic display 202 is not necessarily fixed or bonded to the core plates 204 or the pp film 212. Instead, the flexible electronic display 202 may be movable within the retainer formed by the inside leather cover 220 and the outside leather cover 208 in a direction substantially perpendicular to the display's 202 bending direction.

Figure 5A:
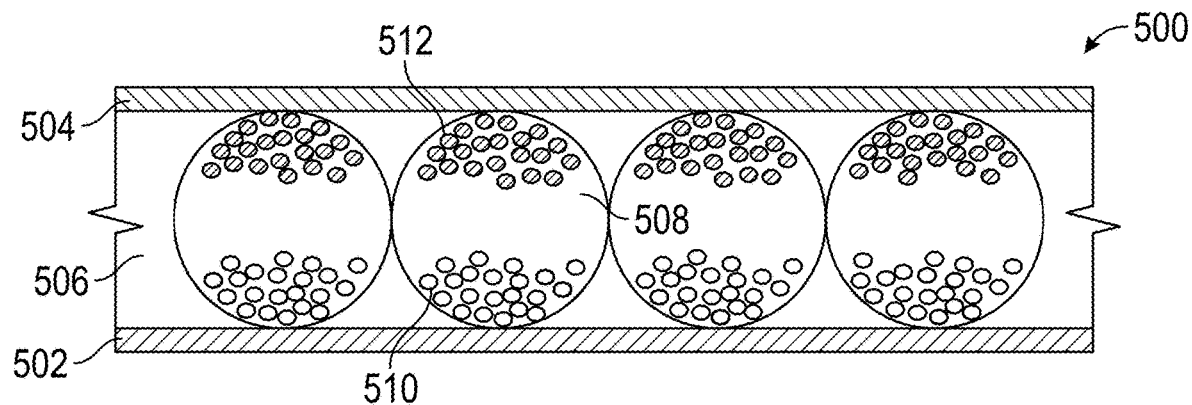
FIG. 5A and FIG. 5B are cross-sectional views of an electrophoretic display layer in accordance with the subject matter presented herein.
Figure 5B:
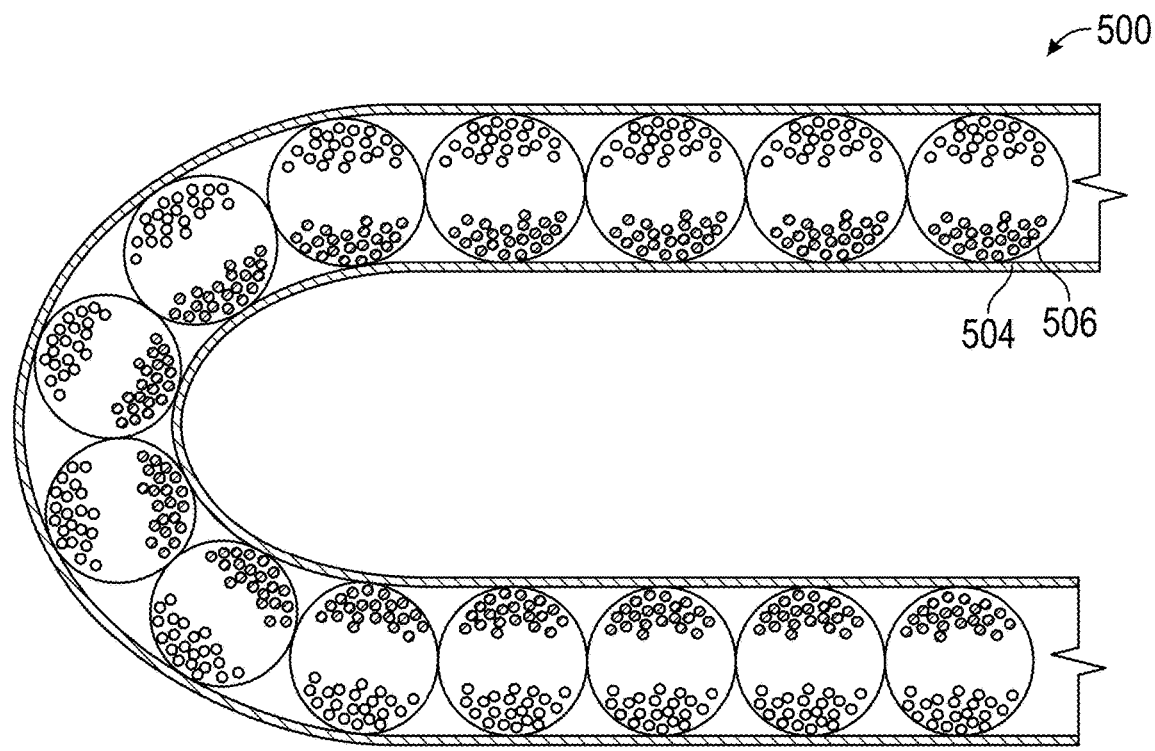

In some embodiments, the flexible electronic display used in the present invention may consist of an electrophoretic display 500. Such electrophoretic display 500 may include, as illustrated in FIGS. 5A and 5B, a pixel electrode layer 502, a front electrode layer 504 and a display layer 506. The display layer 506 may include electrophoretic pigment particles enclosed in micro-capsules or micro-cups. Illustrated in FIG. 5A are micro-capsules comprising black and white electrophoretic pigment particles, but it should be appreciated that the black and white electrophoretic pigment particles may be enclosed in micro-cups or other encapsulating means for the purpose of the present invention. The front electrode 504 may function as the viewing side of the display 500, in which case the front electrode 504 may include a transparent conductor, such as Indium Tin Oxide (ITO) (which in some cases may be deposited onto a transparent substrate, such as polyethylene terephthalate (PET)). In the display of FIG. 5A, display layer 506 can be a particle-based medium between electrode layers 502 and 504 that includes a plurality of micro-capsules. Within capsule 508 is a liquid medium and one or more types of colored pigment particles that include white pigment particles 510 and black pigment particles 512. The pigment particles 510 and/or 512 may be controlled (displaced) with an electric field (e.g., produced by electrodes in layers 504 and 502), thus making the display 500 to operate as an electrophoretic display when addressed. It should be appreciated that the spherical shape of the micro-capsules presented herein are for illustrative purposes, since in practice the microcapsules may have a variety of non-spherical shapes, including flattened spheroids, cylinders and polygonal prisms; see, for example, U.S. Pat. Nos. 6,067,185; 6,392,785; 7,109.968; and 7,391,555. FIG. 5B is an enlarged cross-section of the bending portion of the electrophoretic display 500. When bent, the display layer 506 will stay intact and no image distortion will result from the bending. In some embodiments, the display 500 may be folded towards the viewing surface 504, similar to a book. However, the display 500 is sufficiently flexible that it can be folded toward other directions as well.

Figure 6:
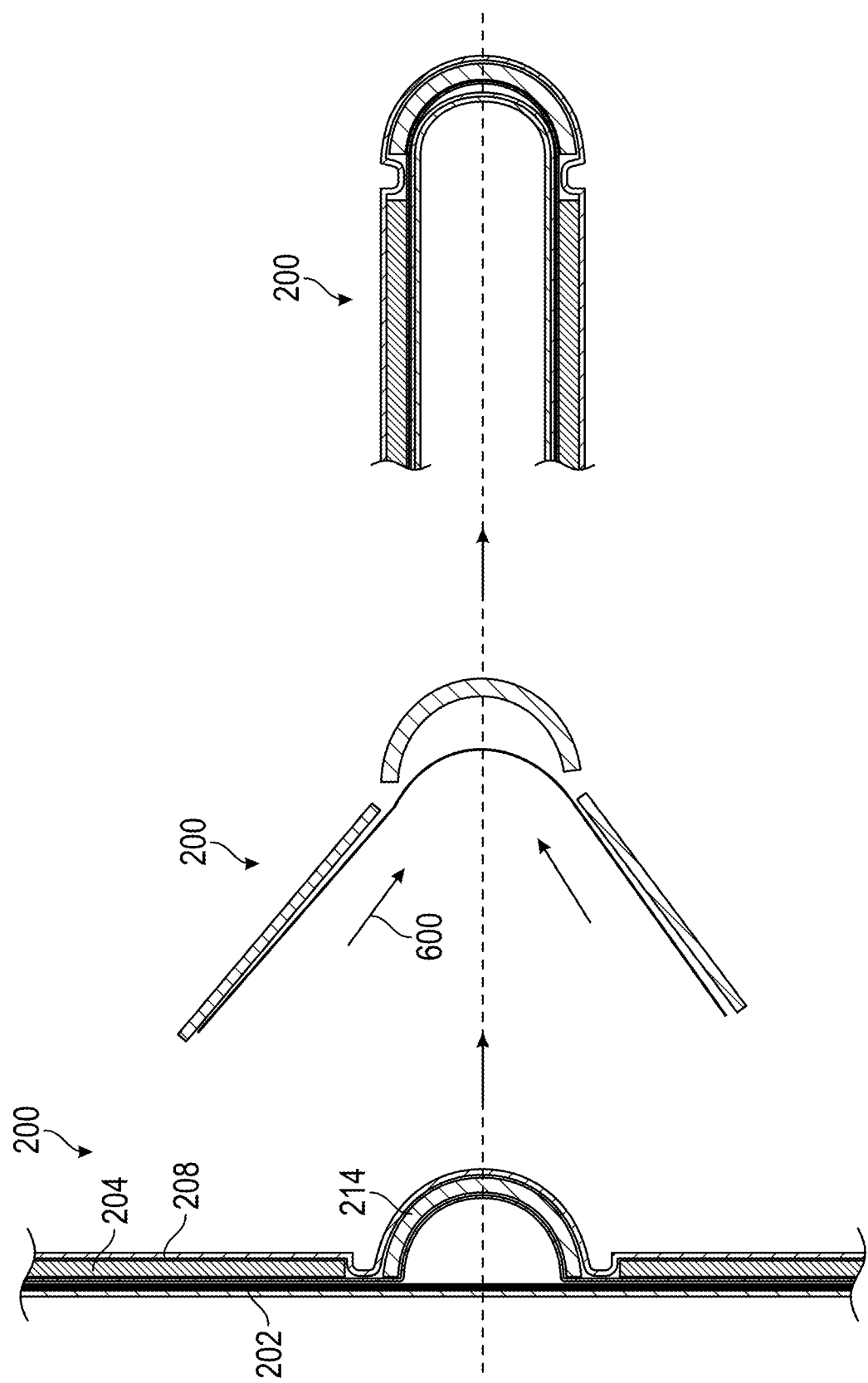
FIG. 6 illustrates cross-sectional views of one embodiment of the electronic book transitioning from an open state to a closed state in accordance with the subject matter presented herein.

FIG. 6 illustrates the electronic book 200 transitioning from an open state to a half-opened state, and finally to a closed or folded state. As also shown in FIG. 4 above, when the electronic book 200 is in an open state, the flexible display 202 may be horizontally disposed on the open portion of the hemi-cylindrical pipe 214. When the electronic book 200 is being folded along the long sides 216 of the pipe 214, the flexible electronic display 202 can move in a direction substantially perpendicular to the folding or bending direction. As a result, the flexible electronic display 202 is bent with a large radius of curvature as illustrated in FIG. 6, adjacent the internal curved surface of the pipe 214, therefore preventing breakage due to the bending. In some embodiments, the pipe 214 can have an external diameter of approximately 7.5 mm and an internal diameter of approximately 5 mm. The outside leather cover 208 may have a thickness of approximately 1 mm, the outside leather cover 208 may have a thickness of approximately 0.8 mm, the pipe 214 may have a wall thickness of about 1 mm, the pp film 212 may be 0.15 mm thick, the back sheet 210 may be 0.2 mm thick and the entire electronic book 200 may be 3.6 to 4.1 mm thick in the opened state. It should be appreciated that the these physical dimensions may vary depending on the materials used, so long as the embodiments presented herein can be properly assembled.

Furthermore, it should be noted that the flexible electronic display 202 is not fixed to the core plates 204, which provides support to the display 202. Thus, folding of the flexible electronic display 202 is not restricted to extremely small radius of curvatures, which may result in display breakages. Instead, the flexible electronic display 202 can move in the direction substantially perpendicular to the bending/folding direction. For example, when bending force is applied to the display 202 to fold the display 202 in a book like fashion, the display 202 can move towards the center of the electronic book 200 so as to reduce the stress exerted on the display 202, as indicated by arrow 600 in FIG. 6. As a result, the bending of the display 202 can be directed and formed in a space within the pipe 214. When the display 202 is further bent to a closed of folded state, the display 202 may be bent so as to follow the inner curvature of the pipe 214, as illustrated in FIG. 6. Therefore, by not binding or fixing the flexible electronic display 202 to the core plates 204, the display 202 may be bent with a curvature sufficiently larger than the minimum radius of curvature for which display breakage may occur, thereby preventing damages to the display 202 due to folding.

Figure 7:
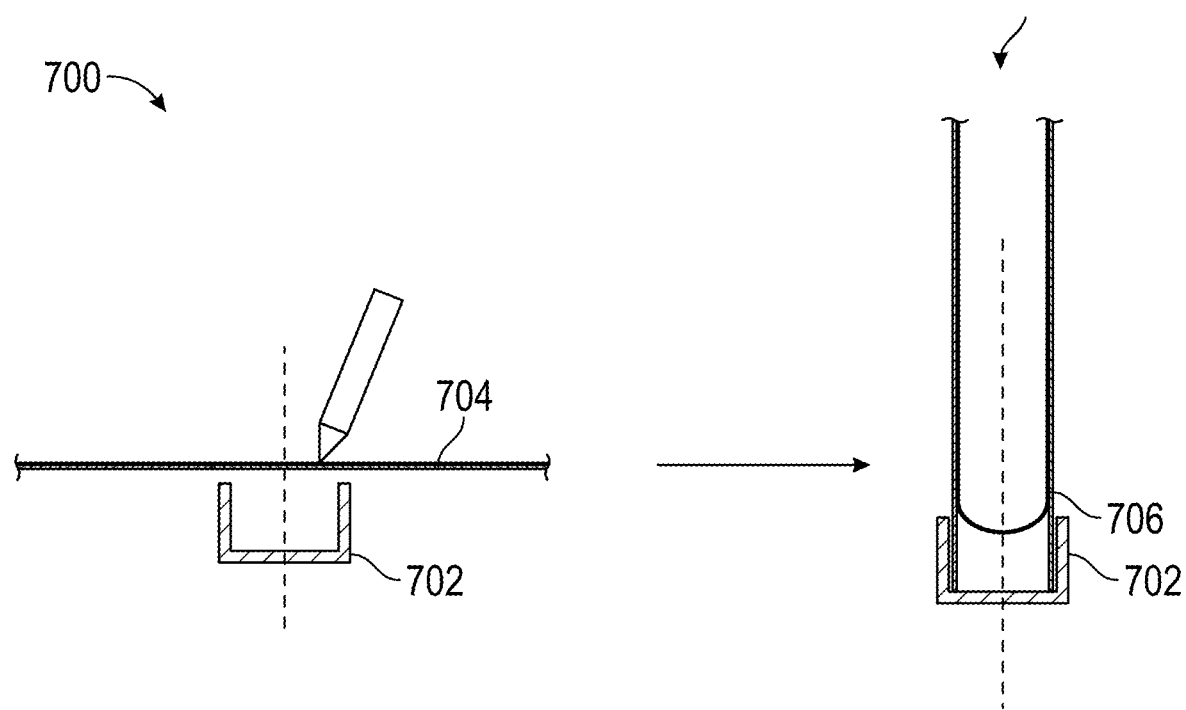
FIG. 7 illustrates cross-sectional views of another embodiment of the electronic book in accordance with the subject matter presented herein, the electronic book having extra portions to its core plates configured to provide support to the display layer.

It should be appreciated that the hollow, hemi-cylindrical shape of the bending-protection portion (i.e., the portion shaped by pipe 214) illustrated above is not meant to be limiting, as any suitable geometric configuration may be adopted here so long breakage of the display 202 can be prevented. For example, FIG. 7 illustrates a trough-shaped bending protection portion 702 for an electronic book 700, the protection portion 702 designed to reduce or prevent display 704 breakage when the electronic book 700 is closed in a book like fashion. In addition, similar to the core plates 204 illustrated above, the electronic book 700 may have two core plates 706 and 708 designed to provide support to the display 704. However, in some embodiments, the core plates 706 and 708 may have extra portions configured to extend into the trough-shaped bending protection portion 702 when the electronic book 700 is in the open state, as illustrated in FIG. 7. The extra portions can be designed to overlap one another, or come into contact with one another when the electronic book 700 is in an opened state. In either cases, the extra portions can come together to form a firm planar supporting surface for the display 704. This may be preferred when the display 704 is the type of display configured to receive user input through direct physical contact, such as a touch panel or when a touch panel is placed over the display 704. In this fashion, in the open state, even the portion of the display 704 that lays above the protection portion 702 can be firmly supported by the overlapping extra portions of core plates 706 and 708. As such, pressure forces generated by a finger, a pen, a stylus or any other similar input devices will not deform any portion of the display 704, including the portion positioned above the protection portion 702, thereby eliminating image distortion and the risk of display 704 breakage. It should be appreciated that the length and/or shape of the extra portions may vary so long as the bending protection member's opening portion can be covered. Furthermore, in some embodiments, an extra support portion may be used to support the flexible display on the empty volume.

Figure 8A:
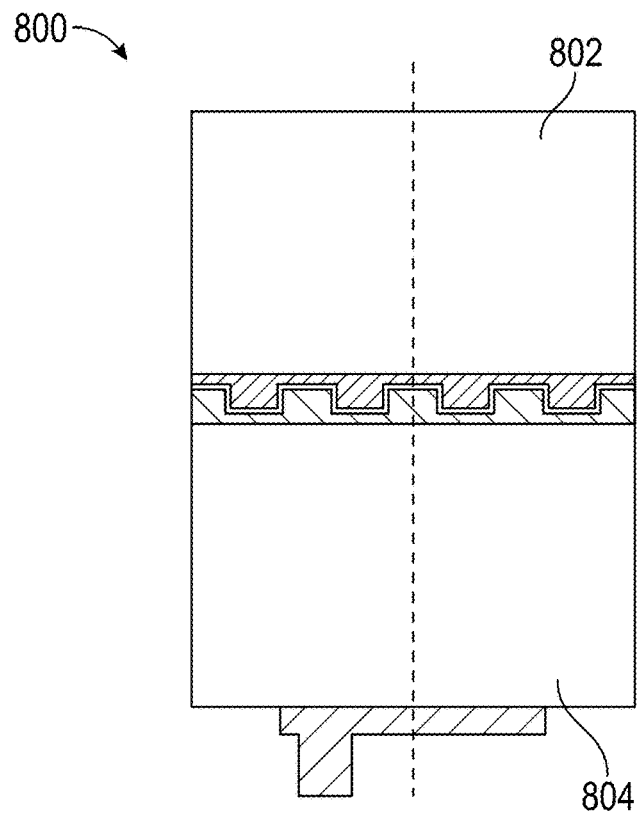
FIGS. 8A to 8C illustrate another embodiment of the electronic book where the core plate's extra portions are joined in an alternating staggered manner.
Figure 8B:
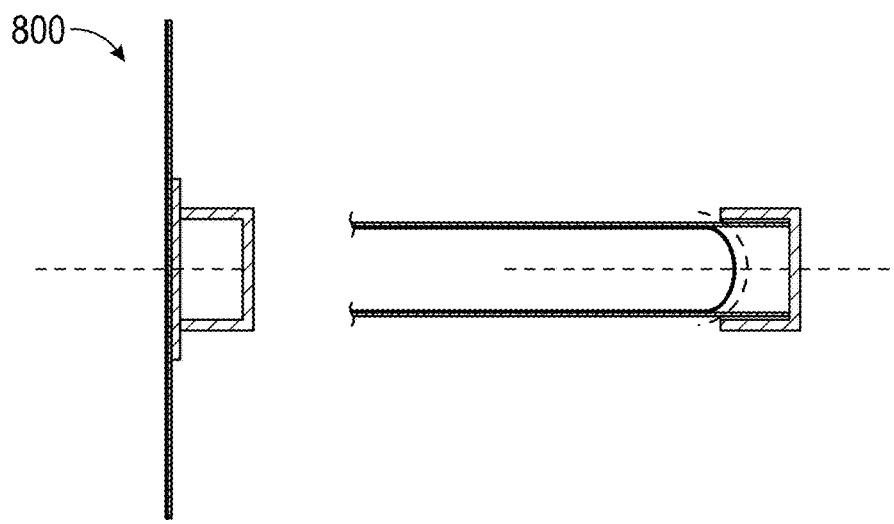
Figure 8C:
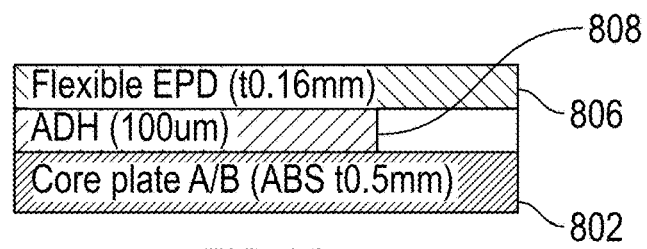

Another embodiment will be discussed below. In above embodiment, by not binding or fixing the flexible electronic display to the core plates, the display may be bent with a curvature sufficiently larger than the minimum radius of curvature for which display breakage may occur, thereby preventing damages to the display due to folding. However, in this embodiment, portions of the flexible electronic display are attached to the core plates but other portions of the flexible electronic display are not, such that resulting radius of curvature of the unattached portions of the display is sufficiently large to prevent breakage. FIGS. 8A to 8C illustrate an embodiment where the core plates 802 and 804 are provided with extensions which are interdigitated with each other. Furthermore, as illustrated in FIG. 8C, portions of the electronic book 800's flexible display 806 may be bonded to the core plates 802 and 804, for example, by using an adhesive such as an adhesive paper 808. In some embodiments, this adhesive (e.g., adhesive paper 808) may bond the flexible display to the substantially planar portion but does not bond the flexible display to the bending-protection portion. The portion of the display 806 that are to be bent in the closed state can remain detached from the core plates 802 and 804. In this fashion, as illustrated in FIG. 8B, when the electronic book 800 is in the closed state, the display 806 is bent at the unattached portion and the resulting radius of curvature is sufficiently large to prevent breakage.

FIGS. 9A to 9C are cross-sectional views of an electronic book 900 transitioning from an open state to a closed state, for better illustrating the general principle presented in FIGS. 8A to 8C. The electronic book 900 has a flexible display 906, where the flexible display 906 includes bonded portions 908 attached (e.g., using adhesion paper) to core plates 902 and 904, and an unbonded portion 910 not attached to the core plates 902, 904 and functions as the bendable portion when the electronic book 900 is in the closed state. As the electronic book 900 is being folded, the bonded portions 908 will move towards each other while the unbonded portion 910 will deflect towards a bending protection portion. On the contrary, an unbonded portion 910 is attached to the core plates 902, 904, the flexible display 906 is bent at any one of the bending axes of the core plate 902 and thus, it can be bent with extremely small curvature, and bending breakage occurs. In some embodiments, the length of the bonded portions 910 and the unbonded portion 908 may be predetermined for determining the radius of curvature (of the display due to folding of the electronic book 900) that is sufficiently large to prevent display 906 breakage. In the above explanation, the core plates 902 and 904 do not need extensions similar to those of core plates 802 and 804.

Figure 10B:
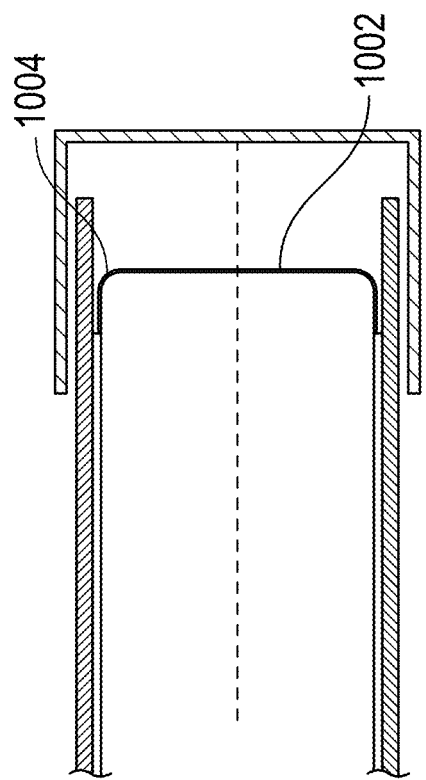
FIGS. 10A and 10B are figures illustrating an electronic book having a short unbonded portion that results in a substantially flat bending portion when the electronic book is folded.
Figure 10A:
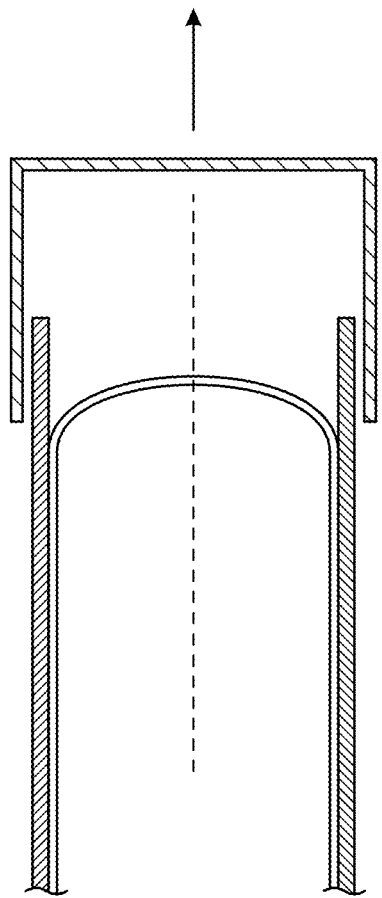

Next, a minimum length of the unattached portion, that is, a minimum length from the bending portion where the bending breakage does not occur can be considered as follows. In general, when the length of the unbonded portion is too small, the resulting radius of curvature will be too small and display breakage can occur as a result. In use, a short unbonded portion will result in a bendable portion that is relatively flat, as illustrated in FIGS. 10A and 10B. Referring now to FIG. 10B, when the length of unbonded portion is small, when folded, the flexible display will be in a stressed state, and the resulting bending portion 1002 will be substantially perpendicular to the bonded portions. Furthermore, the parts 1004 of the bending portion 1002 adjacent the bonded portions have a radius of curvature that is smaller than the minimum radius of curvature can be exerted on the display without causing display breakage. It is understood that a minimum length for the unbonded portion can be determined by multiplying the minimum radius of curvature by $\pi/2$. In an exemplary embodiment, an unbonded portion may be about 19 mm in length, a bending protection member may be about 0.5 mm in thickness, an adhesion paper may be 100 µm in thickness and a flexible display may be 0.16 mm in thickness.

From the foregoing, it will be seen that the present invention can provide an image display apparatus that is thin and light-weighted and may be folded like a book. The image display apparatus can include a flexible display and a bending-protection member designed to accommodate the folding of the flexible display. In use, the display apparatus can be carried and stored like a regular book.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An image display apparatus comprising:
   a flexible electronic display comprising a bendable portion that is flexible and configured to display an image;
   a support member comprising a substantially planar portion that resists bending and a bending-protection portion that bends and protects the bendable portion of the flexible display; and
   a retainer for retaining the flexible electronic display proximal to a surface of the support member;
   wherein:
      the retainer contacts the flexible electronic display and limits the motion of the flexible electronic display with respect to the support member;
      the retainer allows the flexible electronic display to move in a direction substantially perpendicular to the direction in which the bending-protection portion is configured to bend; and
      the bending-protection portion includes walls defining a cavity configured to accept deflection of the flexible electronic display during bending.

2. The image display apparatus according to claim 1, wherein the flexible electronic display comprises an electrophoretic medium.

3. The image display apparatus according to claim 2, wherein the electrophoretic medium is encapsulated.

4. The image display apparatus of claim 2, wherein the electrophoretic medium is distributed in a plurality of microcells.

5. The image display apparatus according to claim 1, wherein the retainer includes a protective cover for protecting the flexible display surface.

6. The image display apparatus according to claim 5, wherein the retainer is a housing having an opening that incorporates the protective cover.

7. The image display apparatus according to claim 1, wherein the retainer is an adhesive.

8. The image display apparatus according to claim 7, wherein the adhesive bonds the flexible display to the substantially planar portion but does not bond the flexible display to the bending-protection portion.

9. The image display apparatus according to claim 1, wherein the retainer is an adhesive and the adhesive is not present in the cavity.

10. The image display apparatus according to claim 9, wherein the bending-protection portion comprises a radius of curvature greater than the radius of curvature of the bendable portion of the flexible display.

11. The image display apparatus according to claim 1, wherein the bending-protection portion defines a bending axis of the support member and comprises a hemi-cylindrical body.

12. The image display apparatus according to claim 1, wherein the substantially planar portion comprises a first planar portion and a second planar portion.

13. The image display apparatus according to claim 12, wherein the first planar portion and the second planar portion are coupled to the bending-protection portion on opposed sides of the bending-protection portion.

14. The image display apparatus according to claim 13, wherein the first planar portion and the second planar portion are coupled to the bending-protection portion with an outer covering coupled to the first and second planar portions and to the bending-protection portion.

15. The image display apparatus according to claim 13, wherein the bending-protection portion overlaps an edge of the first planar portion and an edge of the second planar portion.

16. The image display apparatus according to claim 13, wherein bending-protection portion is flexible and allows the first planar portion to move in an arc with respect to the second planar portion.

17. The image display apparatus according to claim 1, further comprising an extra support portion supporting the flexible display on the empty volume.

* * * * *